US00RE50627E

(19) United States
(12) Reissued Patent
Appelbaum et al.

(10) Patent Number: US RE50,627 E
(45) Date of Reissued Patent: Oct. 7, 2025

(54) WIRED AND WIRELESS MICROPHONE ARRAYS

(71) Applicant: Advanced Technology Development, Inc., Gainesville, FL (US)

(72) Inventors: Jacob G. Appelbaum, Gainesville, FL (US); Paul Wilkinson Dent, Pittsboro, NC (US); Leonid Krasny, Cary, NC (US)

(73) Assignee: Advanced Technology Development, Inc., Gainesville, FL (US)

(21) Appl. No.: 16/402,088

(22) Filed: May 2, 2019

Related U.S. Patent Documents

Reissue of:
(64) Patent No.: 9,641,933
Issued: May 2, 2017
Appl. No.: 13/908,178
Filed: Jun. 3, 2013

U.S. Applications:
(60) Provisional application No. 61/690,019, filed on Jun. 18, 2012.

(51) Int. Cl.
*H04R 3/00* (2006.01)
*H04R 29/00* (2006.01)

(52) U.S. Cl.
CPC ..... *H04R 3/002* (2013.01); *H04R 29/005* (2013.01); *H04R 2201/401* (2013.01)

(58) Field of Classification Search
CPC . H04R 3/002; H04R 29/005; H04R 2201/401
USPC ..... 381/71.11, 71.12, 122; 367/138
See application file for complete search history.

(56) References Cited

U.S. PATENT DOCUMENTS 4,008,376 A * 2/1977 Flanagan ..... H04M 3/56 379/206.01
4,149,032 A * 4/1979 Peters ..... H04R 3/005 330/124 R
4,449,238 A * 5/1984 Lee ..... H04N 7/15 348/14.08
4,658,425 A * 4/1987 Julstrom ..... H04M 3/569 379/206.01
5,404,397 A * 4/1995 Janse ..... H04R 3/02 370/260

(Continued)

FOREIGN PATENT DOCUMENTS

JP 08116353 A * 5/1996

OTHER PUBLICATIONS

"Unwanted." Merriam-Webster.com Dictionary, Merriam-Webster, https://www.merriam-webster.com/dictionary/unwanted. Accessed Oct. 7, 2020. (Year: 2020).*

(Continued)

*Primary Examiner* — Karin Reichle
(74) *Attorney, Agent, or Firm* — COATS & BENNETT, PLLC

(57) ABSTRACT

An acoustic noise canceling microphone arrangement and processor that uses a principal microphone and other microphones that may be incidentally or deliberately located in the vicinity of the principal microphone in order to derive an audio signal of enhanced signal-to-background noise ratio. In one implementation, the principal and incidental microphones comprise the microphone built into a mobile phone and the microphone built into a Bluetooth headset.

39 Claims, 7 Drawing Sheets

(56) References Cited

U.S. PATENT DOCUMENTS 5,561,737 A * 10/1996 Bowen ..... H04M 3/56 379/206.01
5,715,319 A * 2/1998 Chu ..... 381/26
6,690,793 B1 * 2/2004 King ..... H03G 3/348 379/421
7,496,387 B2 * 2/2009 Byford ..... H04M 1/6066 381/74
7,706,821 B2 * 4/2010 Konchitsky ..... H04R 3/00 455/114.2
7,983,428 B2 * 7/2011 Ma ..... H04M 9/082 379/406.01
8,428,661 B2 * 4/2013 Chen ..... H04R 3/005 455/570
8,606,249 B1 * 12/2013 Goodwin ..... H04B 3/20 370/261
8,774,875 B1 * 7/2014 Halferty ..... H04R 3/005 379/392
8,848,901 B2 * 9/2014 Diethorn ..... H04R 3/005 379/392.01
8,924,206 B2 * 12/2014 Sun ..... G10L 21/0272 704/226
2002/0126856 A1 * 9/2002 Krasny ..... G10L 21/0208 381/94.1
2002/0141601 A1 * 10/2002 Finn ..... H04R 3/005 381/92
2003/0027600 A1 * 2/2003 Krasny ..... G10L 21/0208 455/564
2003/0206640 A1 11/2003 Malvar et al.
2004/0013252 A1 * 1/2004 Craner ..... H04M 1/247 379/142.01
2004/0058674 A1 3/2004 Yoakum
2004/0131201 A1 * 7/2004 Hundal ..... H04M 9/082 381/77
2004/0192362 A1 * 9/2004 Vicari ..... 455/507
2004/0213419 A1 * 10/2004 Varma ..... 381/92
2005/0060142 A1 * 3/2005 Visser ..... G10L 21/0208 704/201
2005/0141541 A1 * 6/2005 Cuny ..... H04W 76/25 370/310
2005/0207567 A1 * 9/2005 Parry et al. ..... 379/406.01
2005/0254640 A1 * 11/2005 Ohki ..... H04R 3/02 379/406.1
2005/0286698 A1 * 12/2005 Bathurst ..... H04M 9/082 379/202.01
2006/0013416 A1 * 1/2006 Truong et al. ..... 381/119
2006/0045063 A1 * 3/2006 Stanford ..... H04W 84/16 370/345
2006/0084504 A1 * 4/2006 Chan ..... A63F 13/06 463/39
2006/0135085 A1 * 6/2006 Chen ..... H04M 1/03 455/79
2007/0021958 A1 * 1/2007 Visser ..... G10L 25/78 704/226
2007/0046540 A1 * 3/2007 Taenzer ..... G01S 7/52003 342/442
2007/0082615 A1 * 4/2007 Mak ..... G06F 9/3879 455/41.2
2007/0149246 A1 * 6/2007 Bodley et al. ..... 455/556.1
2007/0237341 A1 * 10/2007 Laroche ..... H04R 3/005 381/94.3
2007/0274540 A1 * 11/2007 Hagen ..... H04M 3/569 381/119
2008/0152167 A1 * 6/2008 Taenzer ..... H04R 3/005 381/94.2
2008/0159507 A1 * 7/2008 Virolainen ..... H04M 1/7253 379/202.01
2008/0201138 A1 * 8/2008 Visser ..... G10L 21/0272 704/227
2009/0220065 A1 * 9/2009 Ahuja ..... H04M 3/569 379/202.01
2009/0238377 A1 * 9/2009 Ramakrishnan ..... G10L 21/028 381/92
2009/0299742 A1 * 12/2009 Toman ..... G10L 21/0208 704/233
2009/0318202 A1 * 12/2009 Bodley ..... 455/575.2
2009/0323925 A1 * 12/2009 Sweeney ..... H04M 9/08 379/406.05
2010/0151787 A1 * 6/2010 Contreras ..... H04B 1/44 455/41.2
2010/0228545 A1 * 9/2010 Ito ..... H04M 3/56 704/226
2010/0266139 A1 * 10/2010 Yuzuriha ..... H04M 3/565 381/80
2011/0019836 A1 * 1/2011 Ishibashi ..... H04R 1/406 381/92
2011/0070926 A1 * 3/2011 Vitte ..... H04R 3/005 381/71.4
2011/0091029 A1 * 4/2011 LeBlanc ..... H04M 3/562 379/202.01
2011/0096942 A1 * 4/2011 Thyssen ..... 381/94.1
2012/0051548 A1 * 3/2012 Visser ..... G10L 21/0208 381/56
2012/0093344 A1 * 4/2012 Sun ..... H04R 3/005 381/122
2012/0183154 A1 * 7/2012 Boemer et al. ..... 381/94.1
2012/0184337 A1 * 7/2012 Burnett et al. ..... 455/569.1
2012/0258772 A1 * 10/2012 Brogle ..... G01D 5/2405 455/556.1
2012/0275621 A1 * 11/2012 Elko ..... H04R 1/04 381/92
2012/0322511 A1 * 12/2012 Fox ..... H04R 3/005 455/570
2013/0010657 A1 * 1/2013 Hannosh ..... H04M 1/6091 370/280
2013/0325458 A1 * 12/2013 Buck ..... H03G 3/3005 704/226
2014/0193009 A1 * 7/2014 Yousefian Jazi ..... H04R 25/453 381/317

OTHER PUBLICATIONS

"Wanted." Merriam-Webster.com Dictionary, Merriam-Webster, https://www.merriam-webster.com/dictionary/unwanted. Accessed Oct. 7, 2020. (Year: 2020).*
Noise. (1999). In S . . . Amos, & R. S. Amos, Newnes Dictionary of Electronics, Newnes (4th ed.). (Year: 2020).*
"Audio frequency." Academic Press Dictionary of Science and Technology, edited by Christopher G. Morris, Elsevier Science & Technology, 4th edition, 1992. Credo Reference, https://search.credoreference.com/content/entry/apdst/audio_frequency/0?institutionId=743. Accessed Aug. 23, 2022 (Year: 2022).*
"Echo canceller." Hargrave's Communications Dictionary, Wiley, Frank Hargrave, Wiley, 1st edition, 2001. Credo Reference, https://search.credoreference.com/content/entry/hargravecomms/echo_canceller/0?institutionId=743. Accessed Aug. 22, 2022 (Year: 2002).*
Hidri Adel, et al., "Beamforming Techniques for Multichannel audio Signal Separation," International Journal of Digital Content Technology & Its Applications, Nov. 2012, vol. 6, Issue 20, pp. 659-668.

* cited by examiner

NEW

WIRED AND WIRELESS MICROPHONE ARRAYS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

Priority for the subject matter herein is claimed from U.S. Provisional Patent Application No. 61/690,019 filed 18 Jun. 2012.

BACKGROUND

The present invention relates to improving the signal to acoustic background noise ratio for voice or other audio signals picked up by acoustic transducers.

Noise-canceling microphones are a known type of prior art transducer used to improve signal to background noise ratio. The prior art noise canceling microphone operates by pressure difference, wherein the wanted source, for example the mouth of a human speaker, is much closer to the microphone than more distant noise sources, and therefore the acoustic pressure difference from the front to the back of the microphone is small for the distant sources but large for the nearby source. Therefore a microphone which operates on the pressure difference between front and back can discriminate in favor of nearby sources. Two microphones, one at the front and one at the back may be used, with their outputs being subtracted.

One disadvantage of the prior art noise canceling microphone is that it requires very close proximity (e.g. 1") to the wanted source. Another disadvantage is that the distance from front to back of the microphone, which may be 1" for example, causes phase shifts at higher frequencies that result in loss of discrimination at frequencies above 1 KHz As an improvement over the noise canceling microphone, the prior art contains examples of using arrays of microphones, the outputs of which are digitized to feed separately into a digital signal processor which can combine the signals using more complex algorithms. For example, U.S. Pat. No. 6,738,481 to present inventor Krasny et al and filed Jan. 10, 2001 describes such a system, which in one implementation divides the audio frequency range into many narrow sub-bands and performs optimum noise reduction for each sub-band.

The dilemma with arrays of microphones in the prior art however is that either of the following is usually true: (a) To avoid the clutter of multiple microphone cables, the microphones are located close together. However, if the microphones have a spacing less than half an acoustic wavelength (6" at 1 KHz) the effectiveness of the array processing is reduced. Even just two microphones spaced 6" apart however implies a large device; larger, for example, than a modern mobile phone. (b) If widely spaced microphones are used, then the clutter and unreliability of extra cables becomes a nuisance.

Thus there is need for methods and devices that overcome the main disadvantages of the need either for extra microphones or a for multitude of extra cables in the prior art outlined above.

SUMMARY

A noise reduction system is provided which uses incidental microphones that are often present in particular applications, but which, in the prior art, are not normally activated at the same time as a principal microphone, or which, if left in an active state, do not in the prior art provide signals that are jointly processed with the signals from a principal microphone. According to the invention, such incidental microphones are activated to provide signals that are processed jointly with signals from one or more principal microphones to effect noise reduction, thereby making better use of existing resources such as microphones and their signal connections to processing resources.

In a first implementation, an array of at least two microphones provides signals to a digital signal processing unit, which performs adaptive noise cancellation, at least one of the microphones providing its output signal to the signal processing unit using a short-range wireless link. The short-range wireless link may be an optical or infra-red link; a radio link using for example a Bluetooth® (a short-range, ad-hoc, wireless network protocol and communication standard) or other suitable radio device; an inductive loop magnetic method with or without a frequency translation; an electrostatic method with or without frequency translation, or an ultrasonic link (frequency translation implied). Preferably, the wireless link digitizes the audio signal from its associated microphone or microphones using a high-quality analog-to-digital encoding technique, and transmits the signal digitally using error correction coding if necessary to assure unimpaired reception at the signal processor.

The signal processor digitizes the signals from any analog microphone sources not already digitized and then jointly processes the digital audio signals using algorithms to enhance the ratio of wanted signals to unwanted signals.

In some applications, the wanted signal may be a single signal, while the noise may comprise a multitude of unwanted acoustic sources. In other applications to be described, there may be multiple wanted signal sources, that may or may not be active at the same time, as well as multiple unwanted noise sources.

In an exemplary first implementation, the invention comprises a mobile phone having an own, internal microphone and used in conjunction with a Bluetooth headset, the signals from the Bluetooth headset being processed jointly with the signals from the mobile phone's own internal microphone to enhance the ratio of the wanted speaker's voice to background noise without introducing additional microphones or cables.

In another exemplary first implementation, participants in the same room and in audio conference with participants at another location are equipped with Bluetooth or similar wireless microphones, the signals from which are received at a signal processor and jointly processed with signals from any other microphones to enhance the signal to background noise ratio for at least one speaker's voice.

Other similar situations arise where multiple microphones exist but where joint processing was not previously considered in the prior art, and can constitute a second implementation of the invention. For example, in an aircraft, the pilot and co-pilot and potentially other crew members already have microphones, and thus by jointly processing the outputs of pilot's and copilot's microphones a reduction in noise can be obtained without the encumbrance of additional microphones or leads. Other applications of this second implementation can be envisaged, for example in army tanks that have multiple crew members already equipped with microphones, or operations in a noisy work environment where co-workers are equipped with duplex headsets for communication; film crews having cameras equipped with boom mikes as well as the crews themselves being equipped with two-way headsets; conferences in which on-stage speakers have individual microphones and audience participants have additional microphones, and so-on. The invention may be employed to enhance signal quality in such scenarios by jointly processing the signals from the multiplicity of microphones that already exist for such applications.

DETAILED DESCRIPTION

During wireless telephone communications the speech signal is often corrupted by environmental noise, which degrades the performance of speech coding or speech recognition algorithms. It is essential to reduce the noise level without distorting the original speech signal.

One conventional approach to solve this problem is a single-microphone noise reduction technique, which utilizes differences in the spectral characteristics of the speech signal and the background noise. It is hampered by the fact that in many situations the speech and the noise tend to have similar spectral distributions. Under these conditions, the single-microphone noise reduction technique will not yield substantial improvement in speech intelligibility. Another approach tried in the prior art was the use of microphone arrays, which however encounter the disadvantages described above in the background section.

Figure 1:
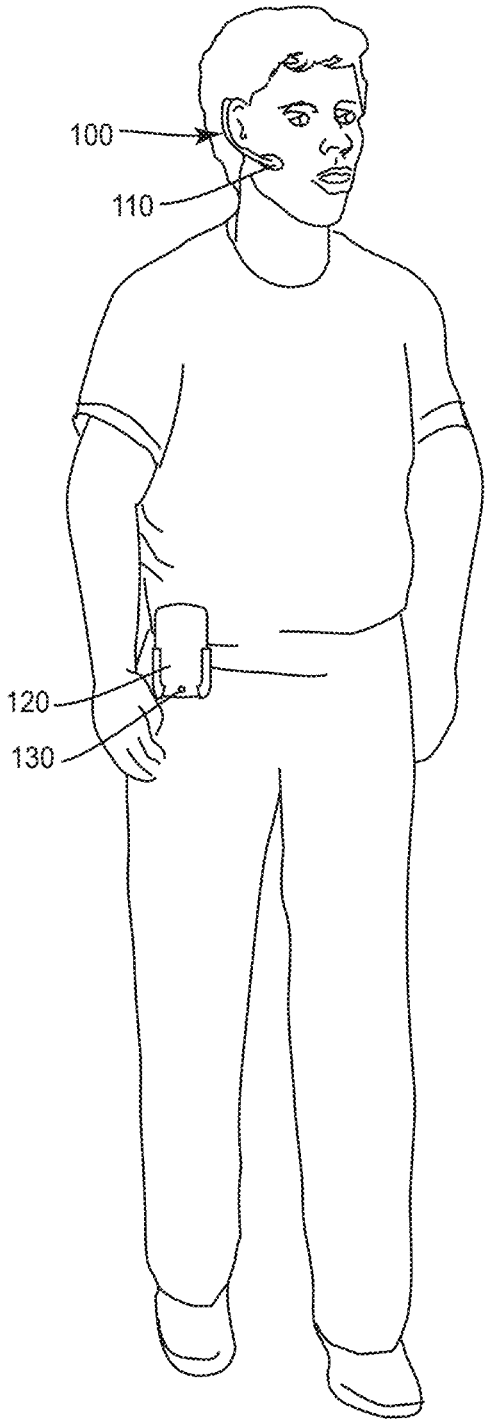
FIG. 1 illustrates a two-microphone situation comprising a mobile phone and a Bluetooth headset.

Wireless headsets are often used with mobile phones when both hands are needed for other functions, such as driving. Such headsets are self contained, comprising earphone, microphone, short range radio link using the Bluetooth standard and battery. In the prior art, the mobile phone takes the audio input for transmission either from its internal microphone or from the signal received from the Bluetooth headset. By contrast, in the situation illustrated in FIG. 1, a mobile phone (120) according to the current invention receives an audio signal both from microphone [1] (110) of the Bluetooth headset (100) via the Bluetooth short range radio link and from microphone [2] (130) of mobile phone (120) and jointly processes both signals in the audio processing section of Mobile terminal (120) in order to enhance the ratio of the wanted audio signal from the speaker to unwanted background noise, thereby improving communication intelligibility in noisy environments without additional microphones or cables. The mobile phone and Bluetooth headset are merely exemplary and not restrictive. For example, another implementation in the same category would be the use of laptop having its own microphone and having a wireless connection to another microphone, such as a Bluetooth headset.

Most mobile phones and laptops of today are already equipped with Bluetooth short range radio links. Bluetooth digitizes all signals and may transmit voice or data or both. Voice is typically converted to 64 kilobits per second continuously variable delta modulation, also known as CVSD for short, and Bluetooth can support 64 kilobits transmission in both directions simultaneously for duplex telephone voice. Upon reception, the 64 kb/s CVSD is first transcoded to 16-bit PCM at 8 or 16 kilosamples per second and then may be further transcoded by a lower bitrate speech encoder for transmission over a digital cellular channel, or else converted to an analog waveform to drive a local speaker or earpiece.

According to this first implementation of the invention, the 64 kb/s CVSD speech (or other form of digitally encoded speech) received via Bluetooth from microphone [1] (*110*) is transcoded if necessary to provide a first PCM audio signal, while the audio signal from microphone [2] (130) of mobile phone (120) is encoded to a second PCM audio signal. The two PCM audio signals are then jointly processed by digital signal processing in mobile phone (120), using algorithms to be described, in order to enhance the ratio of the wanted audio signal to background noise.

One basic principle that can be used for signal-to-noise-ratio enhancement is to divide each audio source signal into its constituent narrowband spectral components, such that the channel through which each spectral component is received may be described by a simple attenuation and phase factor, that is by a complex number. Noise arriving from different locations than the wanted signal has different attenuation and phase factors, so that it is possible to find complex multiplicative combining factors for weighted combining of the two source signals such as to favor the wanted signal and disfavor the noise. The optimum combining factors may thus be chosen independently for each frequency component of the wanted signal.

Figure 2:
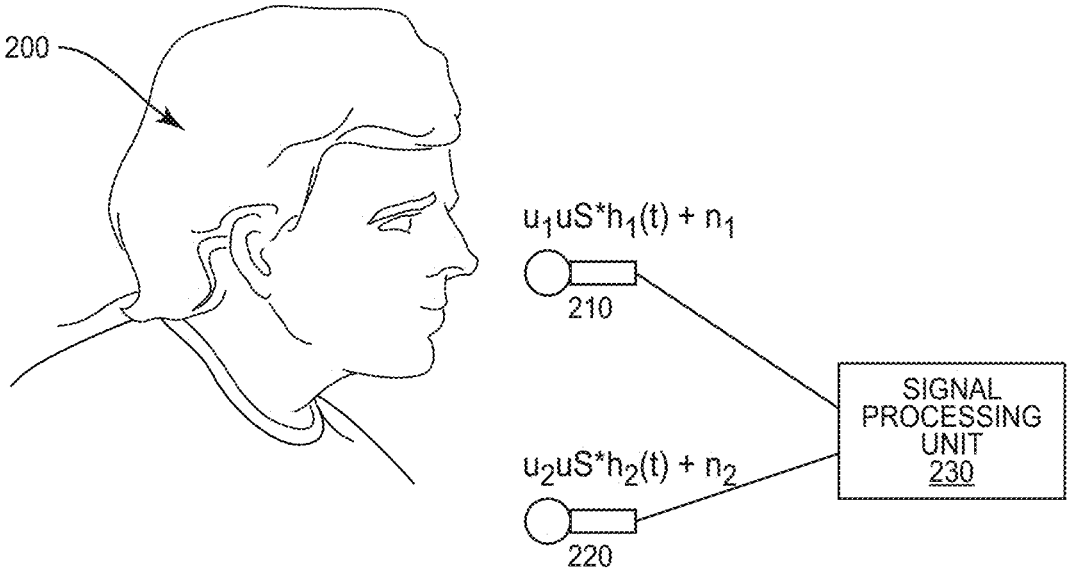
FIG. 2 illustrates the sampling of a speakers voice by two microphones connected to a joint processing unit.

It is also possible to perform noise cancellation or reduction by time domain processing. FIG. 2 illustrates receipt of a signal S from speaker (200) at a first microphone (210) via a channel with impulse response h1(t). The received signal is thus S convolved with h1(t), written S*h1(t). To this is added a first noise signal n1. Likewise the speaker's voice S is received via a second microphone (220) through a second channel h2(t), with additive noise n2. If there is a single noise source causing n1 and n2, then n1 is the result of receiving n through a 3rd channel h3(t) while n2 is the result of receiving n through a 4th channel h4(t). Convolution can be replaced by polynomial multiplication when dealing with sampled signals, leading to the matrix equation $$\begin{pmatrix} u1(z) \\ u2(z) \end{pmatrix} = \begin{pmatrix} h1(z) & h3(z) \\ h2(z) & h4(z) \end{pmatrix} \begin{pmatrix} s \\ n \end{pmatrix} \qquad \text{Equation A}$$

The above matrix of polynomials may be inverted by the usual matrix inversion formula Adjoint/Determinant to completely eliminate the noise, giving:

$$S=[h1(z)\cdot u1(z)-h3(z)\cdot u2(z)]/[h1(z)\cdot h4(z)-h2(z)\cdot h3(z)] \qquad \text{Equation B}$$

The numerator in equation B is simply a Finite Impulse Response (FIR) filter which is always stable. The denominator represents an Infinite Impulse Response (IIR) filter which may not be stable. However, omission of the IIR denominator is simply equivalent to passing the speech signal through an FIR filter with the same coefficients, and just alters the frequency response of the speech in a way that is no different from other acoustic effects of the environment. If desired, stable IIR factors that represent rapidly decaying impulse responses can be left in the denominator of the right hand side of equation B. Also, IIR factors that represent unstable, exponentially rising impulse responses become stable factors if applied to the signal using time-reverse processing, that is the audio samples are processed in time reversed order by accepting a delayed output so that future samples are used to correct the current sample. More information on inverting matrices of impulse response polynomials may be found in U.S. Pat. No. 6,996,380 to Dent, filed Jul. 26 2001, which is hereby incorporated by reference herein.

In order to perform the matrix inversion described above, the channel polynomials $h_1(z) \ldots h_4(z)$ must be determined. However, this method is only useful when the number of independent noise sources is relatively small, and lower than the number of microphone signals being jointly processed. When the noise has a more diffuse character, other methods to be described are more appropriate.

Figure 3:
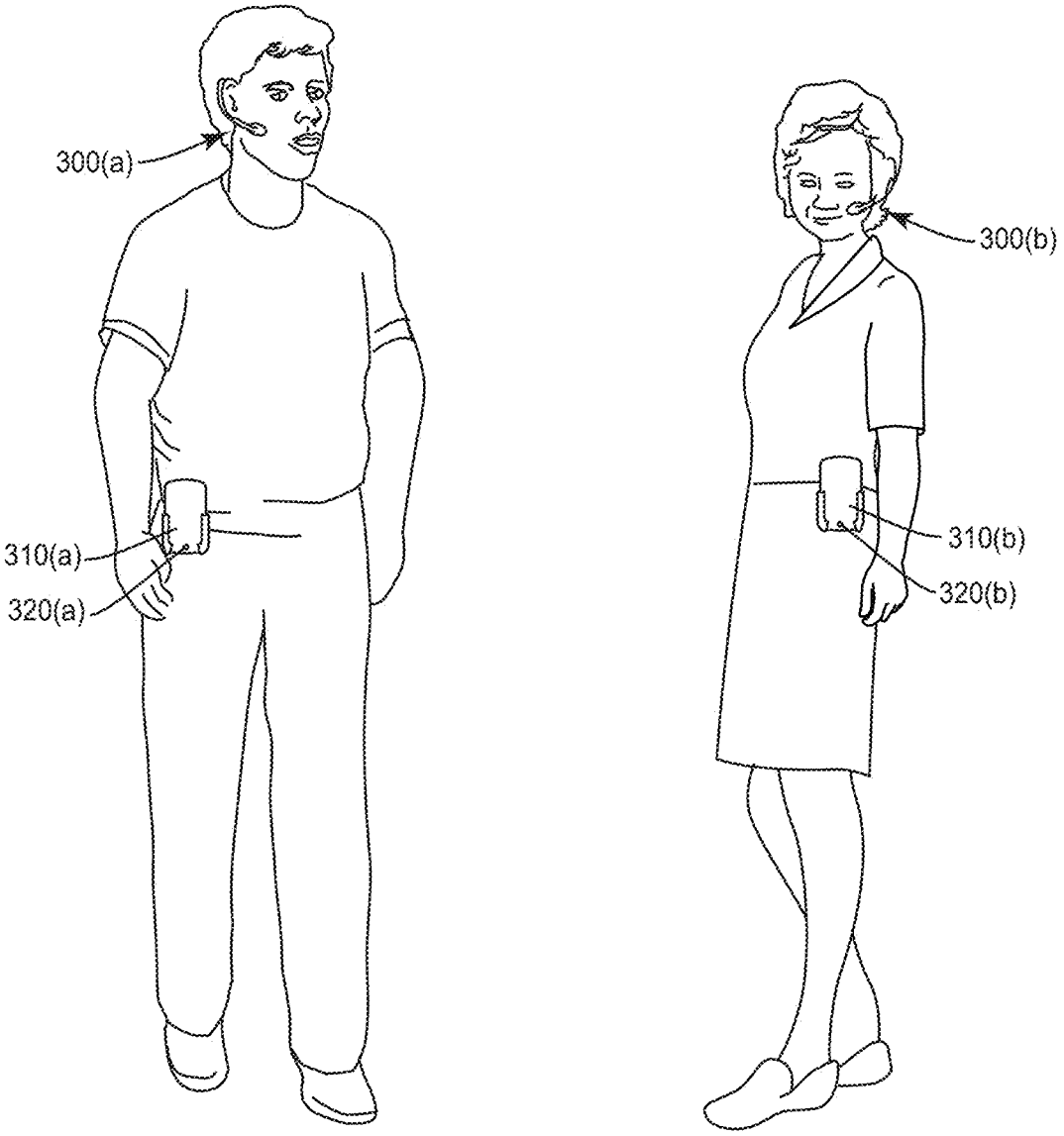
FIG. 3 illustrates a multiple microphone situation when multiple parties collaborate in close proximity.

FIG. 3 illustrates a situation comprising more than two microphones. A number of collaborating speakers, for example co-workers in a noisy factory, each have wireless headsets 300(a), 300(b) . . . etc., as well as potentially a unit, that could be clipped to belt, that can itself have an inbuilt microphone. Thus the number of microphone signals available for joint signal processing can be as many as two times the number of collaborators. Depending on the system configuration, the signal processing may have fewer than the total number of signals available for joint processing. For example, if no central station or base station is involved, the belt-worn unit 310(a) may process signals only from headset [1] (300(a)) and microphone [2] (320(a)) to cancel noise prior to transmission to the other collaborators' belt-worn wireless units such as unit 310(b). However, unit 310(b) can now further process the signal received from the first collaborator jointly with audio signals received from his local microphone 320(b) and the microphone of headset 300(b) to further reduce noise that was correlated with the remaining noise from the first collaborator.

Figure 7:
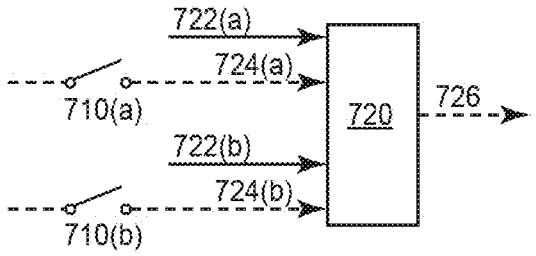
*FIG. 7 illustrates multiple microphones, wherein a currently active speaker is indicated by activation of a Push-To-Talk (PTT) pressel.*
Figure 7:
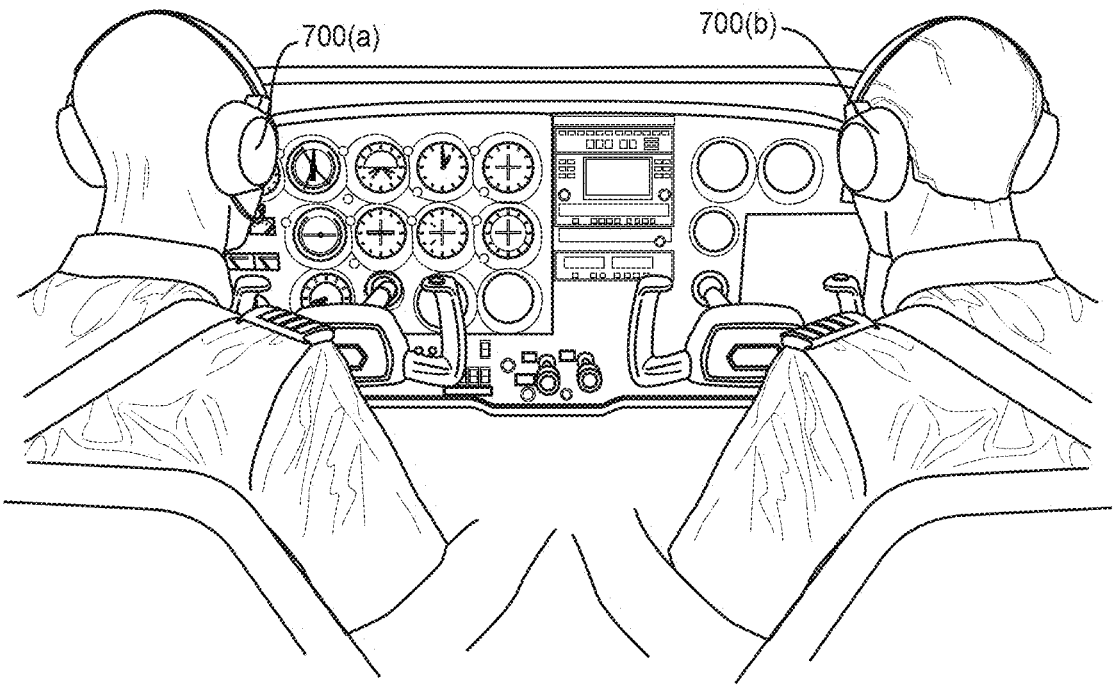

One difference between the current invention and prior equipment is that microphones associated with other than the current speaker may remain in an active state in order to enhance noise suppression. [Consider] *FIG. 7 depicts*, for example, an aircraft having a pilot and co-pilot, each equipped with a headset *700*(*a*), *700*(*b*) comprising earphones and microphone. Press-to-talk is generally used in such situations to prevent leaving a microphone in the "live" state which, in the prior art, would amplify ambient noise and feed it through to all crew headsets, causing annoyance. However, it may be realized that a microphone may be left in the active state collecting *audio* signals *722*(*a*), *722*(*b*) without necessarily passing those signals directly through to crew headsets *700*(*a*), *700*(*b*). Thus, according to the invention, the *audio* signals *722*(*a*), *722*(*b*) are processed together with the *audio* signal *722*(*a*), *722*(*b*) from the principal microphone, which in this example would be the microphone associated with an activated press-to-talk switch, *710*(*a*), *710*(*b*), *as indicated by associated pressel switch signals 724*(*a*), *724*(*b*), in order to enhance the signal to noise ratio of the wanted signal from the principal microphone. In a second implementation of the invention therefore, the microphone and its associated microphone amplifier are left in the active state whether the pressel switch *710*(*a*), *710*(*b*) is activated or not; the output however not being simply passed through to the headsets *700*(*a*), *700*(*b*) or communications system, but rather being jointly processed with the signal designated to be the wanted signal. A signal may for example be designated to be the wanted signal by determining which pressel switch or switches *710*(*a*), *710*(*b*) are pressed, their associated microphones then being designated to be the principal microphones and the persons pressing the associated pressel switches *710*(*a*), *710*(*b*) are assumed to be desirous of being heard. The audio signals *722*(*a*), *722*(*b*) of the active speakers desirous of being heard are passed from the microphones designated as the principal microphones to the signal processing unit *720* where those signals are now processed jointly with signals *722*(*a*), *722*(*b*) from other microphones that, according to the invention, are placed in an active state whether their associated pressel switches *710*(*a*), *710*(*b*) are depressed or not. After joint processing to suppress background noise corrupting the wanted signal, the noise-reduced signal *726* is then routed to crew earphones or other communications equipment such as ground-to-air radio. Similar situations arise in combat vehicles such as army tanks for example. An army tank may have several crew members, including commander, gunner, loader and driver, each equipped with a press-to-talk headset. In the prior art, no microphone output was provided unless the associated pressel switch was operated. In the current invention, all microphones are made electrically available all the time, the operation of a pressel switch merely indicating which speaker is desirous of being heard. The output of the associated microphone is then jointly processed with the output of at least one other microphone to enhance signal-to-noise ratio before passing the signal *726* on to the headset earpieces through intercom equipment or to radio equipment.

Thus the second implementation is categorized in general by jointly processing the output of one or more microphones that are associated with a wanted speaker or audio sources together with the output of one or more microphones normally associated with a different speaker or audio source. The term "normally associated with" reflects the meaning that that microphone is so positioned as to favor the audio source that would be heard best from that position, whether or not an audio source is present and active at that position at any particular instant. Clearly, a microphone attached to the personal headset of a particular person is associated with that person and not normally associated with a different person. Nevertheless, according to the invention, the microphone normally associated with one person or location can be useful to enhance the signal noise ratio of the signal from the principal microphone, which is the microphone associated with the current active speaker, audio source, or location.

In another system configuration, in the case of two collaborators each having a main and auxiliary microphone, the audio signal from all four microphones could be transmitted using a two-channel duplex link between the two collaborators whose belt-worn units [(]320(a) and 320(b) respectively would jointly process all four signals in order to enhance the ratio of the other speaker's voice to background noise.

In yet another system configuration, in order to reduce the complexity and power consumption of the belt-worn units, the audio signals from the one or two microphones each of a multiplicity of collaborators could be transmitted to a central radio base station nearby in the same location, which would jointly process all signals to enhance the signal to noise ratio for each speaker and then return the processed signal of the speaker deemed to be currently active to all parties via a return radio link. Such a radio set would differ considerably from the prior art, as it may be transmitting audio from its associated microphone substantially all the time, whether the pressel switch was pressed or not, the state of the pressel switch, if one is provided, being signaled independently over the radio channel to indicate that the speaker is desirous of being heard. Upon the receiving system detecting via the signaling that a pressel switch has been activated, the receiving system designates the microphone of the remote unit with the activated pressel switch to be a principal microphone, and passes an indication to the signal processing to jointly process all received microphone signals in order reduce the noise noise on the the audio signal received from the principal microphone. It may be realized that Voice Activity Detection (VAD) may be provided in lieu of a pressel switch for hands free operation of the remote unit.

Figure 4:
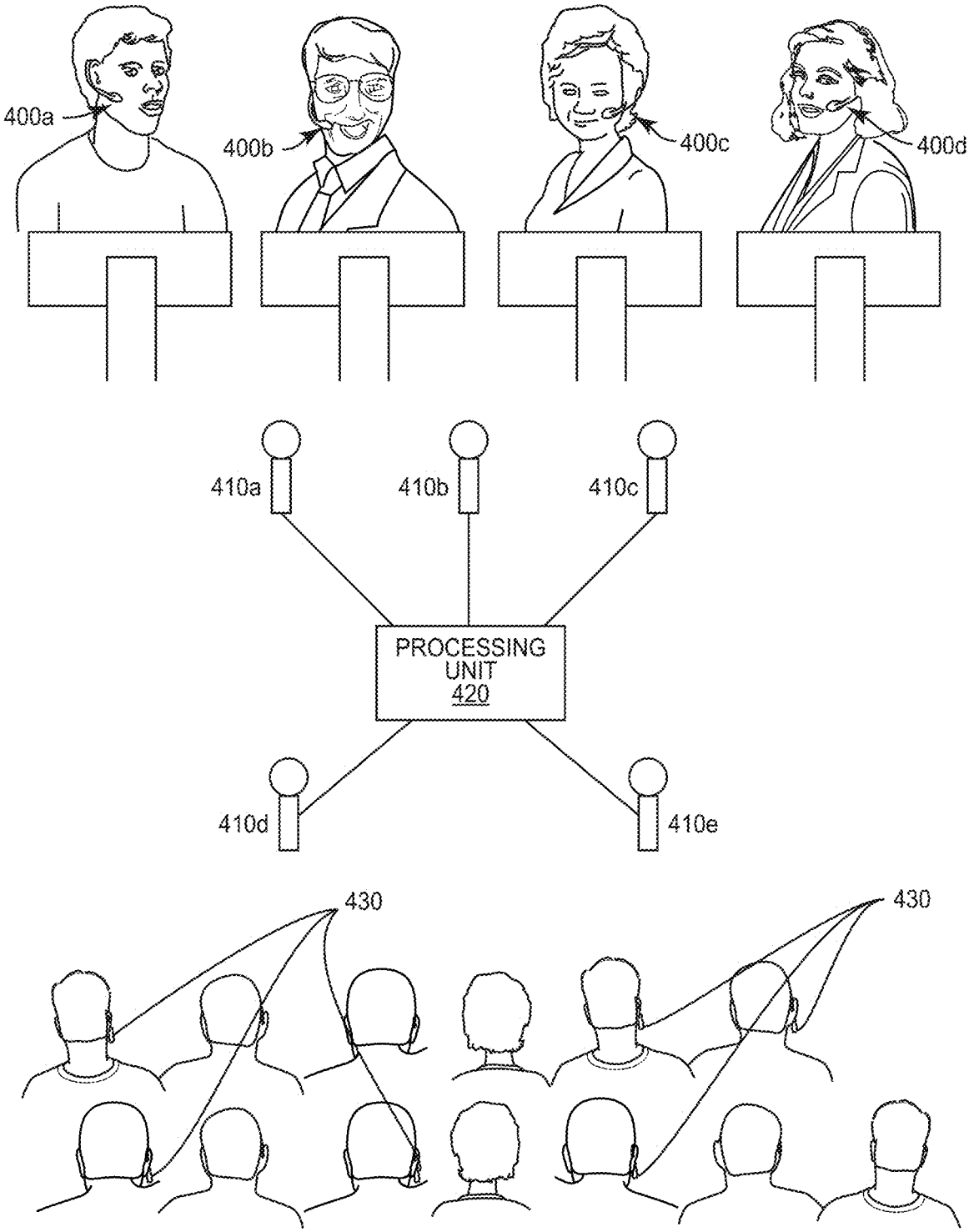
FIG. 4 illustrates multiple microphones available at a conference having individual microphones for on stage and off-stage participants as well as fixed microphones.

A similar scenario to that just described is shown in FIG. 4. A conference comprises a panel of speakers on stage, whose voices may be picked up by a number of fixed microphones as well as individual wireless "lapel mikes", and in addition one or more members of the audience may have lapel mikes or be passed a roaming microphone to ask questions. Thus, just as in the scenario postulated in FIG. 3, there are a number of microphone signals available to be jointly processed. In FIG. 4, all microphone signals are conveyed by wire or wirelessly to central processing unit 420 which processes the signals jointly in order to enhance the signal to background noise ratio of any desired speaker.

In any of the implementations heretofore described, the joint processing may insert a number of samples additional delay in any digitized audio stream to roughly align all audio sources in time to compensate for the different delays of different methods of transporting the signals from each microphone to the common processing unit.

Figure 5:
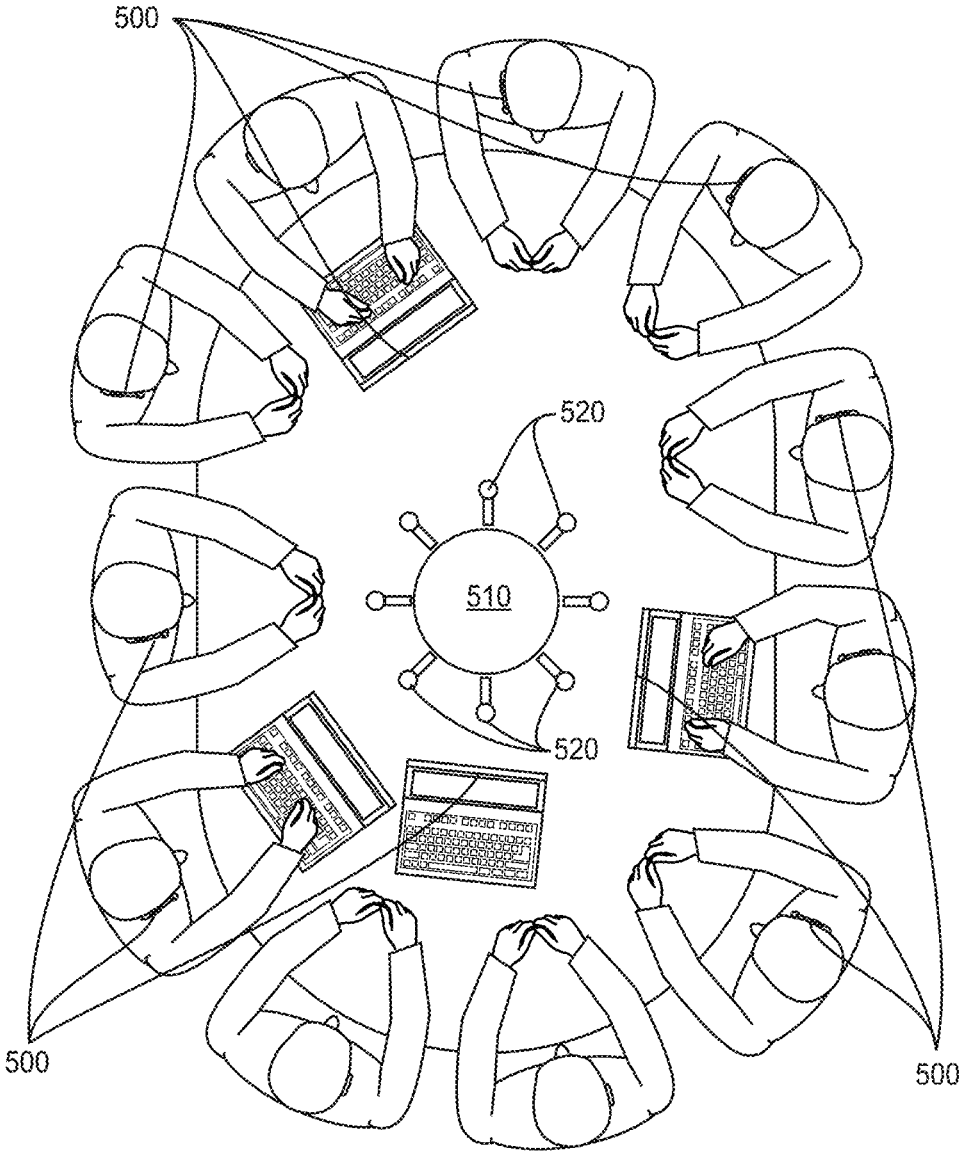
FIG. 5 illustrates multiple microphones available during a teleconference using a speakerphone and individual wireless headsets.
Figure 6:
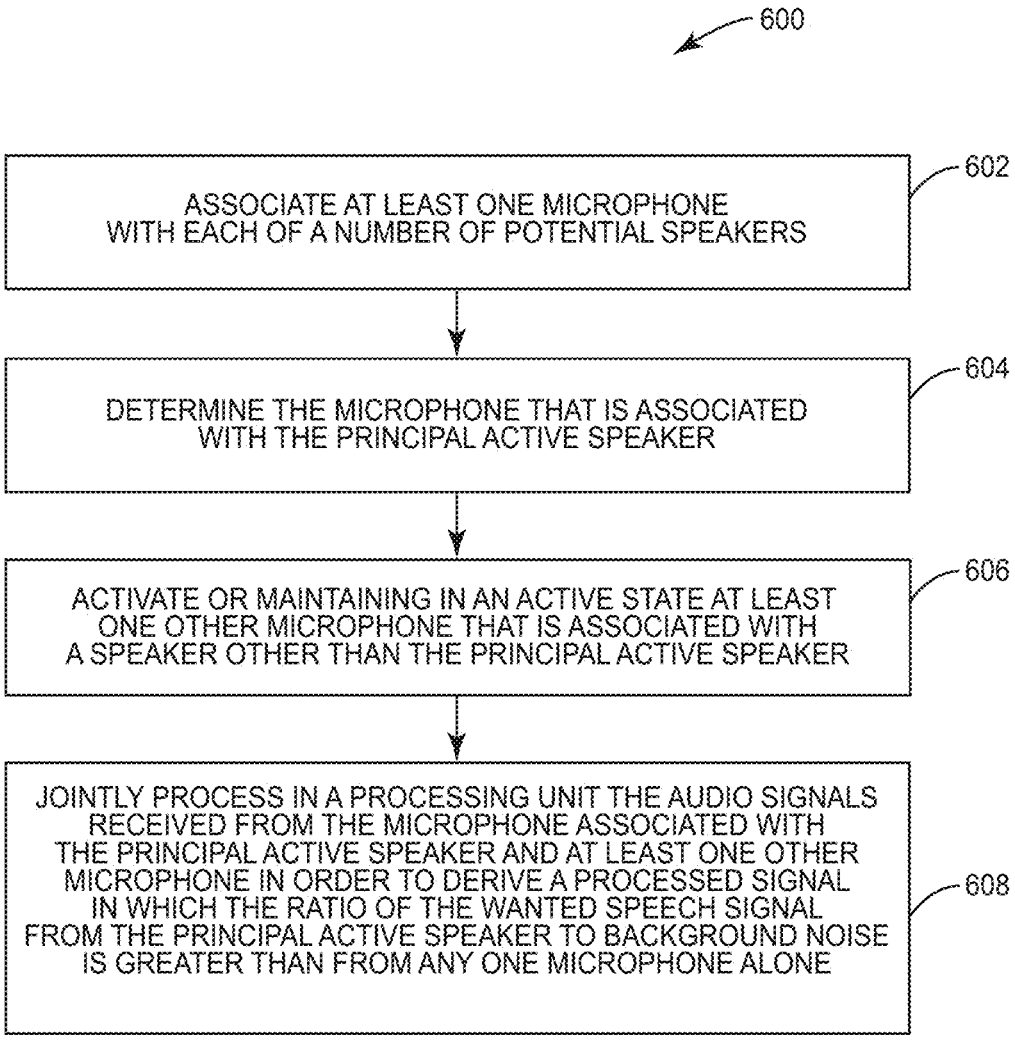
FIG. 6 is a flow diagram of a method of improving the signal to noise ratio of an audio signal.

A further example of scenarios amenable to the current invention is shown in FIG. 5. A number of participants in a teleconference are sitting around a speakerphone in a conference room. Each may have a laptop with *an* audio headset, and the laptops may be networked to a central server, either by cable or by WiFi. In one situation, Bluetooth headsets convey audio to and from the laptop and the laptop passes the audio on via the network to a server. In an alternative scenario the Bluetooth headsets communicate audio directly to a multiple-Bluetooth-equipped speakerphone. In yet another scenario, a headset wired into a laptop uses the laptop's built-in Bluetooth or WiFi to convey audio to the speakerphone, equipped likewise. The speakerphone may also comprise a number of fixed microphones that are arranged around the conference table. The speakerphone may receive all microphone signals, either by wire, Bluetooth, WiFi or by a wired (Ethernet) connection to a server, or any combination of the above, and process the signals jointly. Alternatively, the speakerphone may just convey the outputs of its microphones to a server which also receives the signals from the participants microphones, and the joint processing may be carried out by software in the server, the server returning the noise-reduced signals to the speakerphone and/or the participants.

In a degenerate case, a single user having a single laptop may be making a call or participating in a conference. For example, the Skype program may exist on the laptop, which is a well known program allowing a computer to place Voice-over-IP (VoIP) calls over the Internet. To implement the invention in this case, the laptop or computer's own microphone may be supplemented by a Bluetooth headset, the audio from both being jointly pre-processed in the computer by a software program configured according to the invention in order to enhance the speech to background noise ratio in noisy environments.

Ultimately, the noise-reduced signal of one or more speakers deemed to be the principal active speakers is conveyed in particular to the remote parties to the teleconference. A duplex teleconference can be considered to comprise two separate, interconnected systems, either or both of which can employ a separate instance of the current invention.

In any of the above situations where multiple potential speakers exist, speech activity detection can be used to determine the principal active speaker as opposed to reliance upon a press-to-talk switch. However, the noise reduction can be applied without waiting for a decision from the activity detector. Noise reduction can be applied with the assumption that a given speaker is active simultaneously for every hypothesis of which speaker is active to obtain noise-reduced signals for all speakers ready and waiting to be selected for broadcast.

In the example of aircraft or tank crew, a hard selection mechanism determined by press-to-talk switch states was described. The use of press-to-talk switches provides the simplest method of source selection. However, other method of source identification can be used. For example, when all potential sources are pre-separated, and available and waiting for selection as just described, a soft-selection mechanism can then be employed, where the gain for a speaker deemed to have become the principally active speaker is ramped up from zero over a period of 50 milliseconds for example, and the gain for a speaker deemed to have become inactive is ramped down over a similar period, in order to avoid the unpleasant clicks of a hard selection. The determination of a speaker becoming active or inactive can be made on the relative strength of the signals, or change thereof. Other techniques known in the art as voice activity detection (VAD) can be used to discriminate sources that contain wanted speech from sources that contain non-speech sounds.

For example, U.S. Pat. No. 6,381,570 describes using adaptive energy thresholds for discriminating between speech and noise, while US patent application publication nos. 2010/0057453 and 20090076814 describe the performance of more complex feature extraction to make a speech/no-speech decision. The fact that the spectrum of speech switches regularly between voiced and unvoiced sounds may be used as a feature to discriminate speech from background noise. Moreover, hysteresis and time delays can be employed to ensure that, once selected, a speaker remains selected for at least a period of the order of one or two seconds before being ramped off if no further activity is detected meantime.

In one embodiment, a simple source identification technique may be used when at least one of the microphones has access to a sampled signal with significantly higher signal to noise ratio than the other microphones. In that case, identification of the principal microphone is made based on relative energy, after compensation for any gain differences that may be learned in a set-up phase. These situations can arise in the scenario where a mobile phone sometimes has access to the microphone on the phone as well as a Bluetooth headset. In this case, the Bluetooth headset is situated close to the speaker's mouth and has higher signal-to-noise ratio for the wanted speech signal, while the microphone on the phone has better access to the noise environment.

One characteristic of all the scenarios mentioned above in both the summary and the description is that the microphone positions are arbitrary relative to each other. Many prior art array processing algorithms, while assuming arbitrary positions for the noise and signal sources, are nevertheless designed for arrays having fixed relative microphone positions. In contrast to that prior art, the current invention is designed for a microphone antenna array where the elements of the array are placed arbitrarily, and may even be changing.

Yet another distinction of the invention is that, in a general, multiple-user case, the noise-enhancing processor may have access, via Bluetooth, to multiple remote microphones, and can select to connect via Bluetooth any remote microphone to pair with the local microphone, depending on which remote microphone has best access to the noise desired to be suppressed. The Bluetooth standard, for example, describes procedures for pairing devices. The ability to pair two microphones in an ad-hoc manner may thus be used to suppress noise in the environment during recording of an acoustic signal, or transmitting it using a communication device. A processor may thus pair remote microphones with local microphones in an ad-hoc manner for best effect. For example, two unrelated mobile phone users may be waiting in a noisy environment such as an airport. One mobile phone user places or receives a call, and simultaneously activates its Bluetooth to perform "service discovery", in order to identify another, nearby mobile phone that is willing to collaborate in noise reduction. The mobile phone engaged in a telephone call may then receive audio via Bluetooth from the other, collaborating mobile phone's microphone as well as its own built-in microphone, and jointly process the two signals in order to suppress background noise.

All of the implementations of the invention are characterized by the joint processing of signals from a principal microphone, which is a microphone normally associated with the currently active speaker, with signals from a microphone not normally associated with or used in the prior art for the currently active speaker, which may herein be referred to in general as an incidental microphone. The incidental microphone is located remotely from said principal microphone by several acoustic wavelengths at a mid-band audio frequency. The microphone in a mobile phone is an incidental microphone in the case where a Bluetooth headset is being used, as in that case, the mobile phone's own microphone is not in the prior art used for the speaker.

A more detailed description of the adaptive noise reduction algorithm now follows.

The input signals observed at the output of the microphones are represented by $u_1(n)$ and $u_2(n)$ etc, i.e., $u_i(n)$ is output sample n of the i-th microphone. The algorithm first decomposes each signal $u_1(n)$ and $u_2(n)$, [etc] *etc.* into a set of narrowband constituent components using a windowed FFT. Overlapping blocks of signals are processed, and the overlap of the windowing function adds to unity to ensure each sample is given equal gain to the final output. The frequency domain filtering technique is thus applied on a frame-block basis. In a mobile telephone, each frame typically contains $N_1$=160 samples. The representation of the spectrum is effectively improved by the overlap increasing the FFT length. The FFT size used is $N_0$=256 points. Therefore, the $N_1$ samples of frame q are overlapped with the last [(N0-N1)] ($N_0$-$N_1$) samples of the previous frame (q−1). As a result, frame q of the microphone i has sampled signal $$u_i(n,q)\equiv u_i(q\cdot N_1-N_0+n), \tag{1}$$

where n=[0,[No]$N_0$−1] and i=[1,2].

The signals (1) are windowed using a suitable windowing function w(n).

For example, it can be a smoothed Hanning window:

$$w(n)=\begin{cases}\sin^2(\pi n/(N_0-N_1)), & n\in[0,(N_0-N_1)/2-1]\\ 1, & n\in[[0,](N_0-N_1)/2,\ (N_0+N_1)/2-1]\\ \sin^2(\pi(n-N_0+1)/(N_0-N_1)), & n\in[(N_0+N_1)/2,(N_0-1)].\end{cases} \tag{2}$$

The FFT is described by:

For k=[0,[No]$N_0$−1] and i=[1,2] calculate $$U_i(k,q)=\sum_{n=0}^{N_0-1} w(n)\cdot u_i(n,q)\cdot\exp(-j2\pi kn/N_0). \tag{3}$$

Voice activity detection (VAD) is used to distinguish between noise with speech present and noise without speech present. If the VAD output voltage $U_{VAD}(q)$ for the frame q exceeds some threshold Tr ($U_{VAD}(q)>Tr$), the VAD makes a decision that the speech signal is present at the q-th frame. Otherwise, if $U_{VAD}(q)$ is less than some threshold Tr0 ($U_{VAD}(q)\leq Tr0$), the VAD makes decision that a speech signal is absent.

The VAD operations are:

(i) Beamforming in the frequency domain:

For k=[0,[No]$N_0$−1] calculate $$Y(k,q)=\frac{1}{2}\sum_{i=1}^{2}U_i(k,q). \tag{4}$$

(ii) Estimation of the noise power spectral density (PSD) at the output of the beamformer (4):

$$\hat{\Phi}_N(k,q)=m\cdot\hat{\Phi}_N(k,q-1)+(1-m)\cdot|Y(k,q)|^2 \tag{5}$$

where m=[0.9,0.95] is a convergence factor.

(iii) VAD output:

$$U_{VAD}(q)=\frac{2}{N_0+2}\sum_{k=0}^{N_0/2}\frac{|Y(k,q)|^2}{\hat{\Phi}_N(k,q)}. \tag{6}$$

A signal correlation matrix is estimated for frame q using the following equations:

For k=[0,[No] $N_0$−1] and i=[1,2] calculate $$\hat{K}_i^S(k,q)=\begin{cases}\hat{K}_i^S(k,q-1)+U_i(k,q)\cdot U_1^*(k,q), & U_{VAD}(q)>T_r\\ \hat{K}_i^S(k,q-1), & U_{VAD}(q)\leq T_r\end{cases} \tag{7}$$

[445 [0064]] One can see from Eq. (7) that if the VAD detects speech ($U_{VAD}(q)>Tr$) at the frame q, the signal correlation matrix is updated. Otherwise, if ($U_{VAD}(q)<=Tr$) the estimation of the signal correlation matrix is switched off.

The Green's function for frame q is estimated by the following:

For k=[0,[No]$N_O$−1] calculate $$\hat{G}_i(k, q) = \frac{\hat{K}_i^S(k, q)}{\hat{K}_i^S(k, q)}. \tag{8}$$

The Noise Spatial Correlation Matrix for frame q is estimated as follows:

For k=[0,[No]$N_O$−1], i=[1,2], and p=[1,2] calculate $$\hat{K}_{ip}^S(k, q) = \begin{cases} m \cdot \hat{K}_{ip}(k, q-1) + U_i(k, q) \cdot U_p^*(k, q), & U_{VAD}(q) \le T_r 0 \\ \hat{K}_{ip}(k, q-1), & U_{VAD}(q) > T_r 0 \end{cases} \tag{9}$$

The initial matrix for Eq. (9) can be chosen as $\hat{K}_{ip}(k,0)=a\cdot\delta_{ip}$, where a is a small constant (a=[0.0001,0.001]).

One can see from Eq. (9) that if VAD does not detect speech, i.e. ($U_{VAD}$ (q)<=Tr0) at the frame q, the noise correlation matrix is updated. Otherwise, if ($U_{VAD}$ (q)>Tr0), the estimation of the noise correlation matrix is switched off.

The frequency responses for microphones 1 and 2 are calculated by means of:

For k=[0,[No]$N_O$/2] calculate $$H_1(k,q)=\hat{K}_{22}(k,q)-\hat{K}_{12}(k[:]q)\cdot\hat{G}_2(k,q) \tag{10}$$

$$H_2(k,q)=\hat{K}_{11}(k,q)\cdot\hat{G}_2(k,q)-\hat{K}_{21}(k,q) \tag{11}$$

The output signal, still in the frequency domain, is then calculated from:

For k=[0,[No]$N_O$/2] calculate $$X_q(k) = \frac{\sum_{i=1}^{2} U_i(k, q) H_i^*(k, q)}{\sum_{i=1}^{2} \hat{G}_i(k, q) H_i^*(k, q)}. \tag{12}$$

For k=[[No]$N_O$/2+1,[No]$N_O$−1] calculate $$X_q(k)=[X_q(N_0-k)]^*. \tag{13}$$

After array processing, a PDS is calculated as follows:

$$\hat{\Phi}_{SN}(k, q)) = \begin{cases} m \cdot \hat{\Phi}_{SN}(k, q-1) + 1 - m) \cdot |X_q(k)|^2, & U_{VAD}(q) > T_r \\ \hat{\Phi}_{SN}(k, q-1), & U_{VAD}(q) \le T_r \end{cases} \tag{14}$$

The following Wiener filter is also used:

$$H_w(k) = \max\left\{H_{w0}, 1 - \frac{\hat{\Phi}_N(k, q)}{\hat{\Phi}_{SN}(k, q)}\right\}, \tag{15}$$

where Hwo=0.315 is a "floor" constant for the Wiener filter, and $$\hat{\Phi}_N(k, q) = \frac{1}{\sum_{i=1}^{2} \hat{G}_i(k, q) H_i^*(k, q)}. \tag{16}$$

Finally, the time domain output samples are computed from:

For n=[0,[No]$N_O$−1] calculate inverse FFT as:

$$U_{OUT}(n) = \sum_{k=0}^{N_0-1} X_q(k) \cdot H_w(k) \cdot \exp(j2\pi kn/N_0). \tag{17}$$

To generalize the algorithm to jointly process more than two microphone signals, the algorithm is modified in the following ways:

The VAD described in [Section] *Equation* 4 is modified in a straightforward way, by indexing the summation over all N microphones. Thus, Eq.(4) is modified as:

$$Y(k, q) = \frac{1}{N}\sum_{i=1}^{N} U_i(k, q). \tag{18}$$

For the case of N microphones, the frequency response of the filter at the i-th microphone is calculated as equation (19) below:

$$H_i(k, q) = \sum_{p=1}^{N} \hat{K}_{ip}^{-1}(k, q)\hat{G}_p(k, q) \tag{19}$$

Matrix $\hat{K}_{ip}^{-1}$ (k,q) in Eq. (19) is an estimate of the inverse noise spatial correlation matrix at the q-th frame.

For the case of N microphones, instead of an estimation of the noise spatial correlation matrix in Equation [7] *9* a direct estimation of the inverse noise spatial correlation matrix $\hat{K}_{ip}^{-1}$ (k,q) based on RLS algorithm is used, which is modified for processing in the frequency domain according to equation (20) below:

$$\hat{K}_{ip}^1(k, q) = \frac{1}{m} \cdot \left\{\hat{K}_{ip}^1(k, q-1) - \frac{D_i(k, q) \cdot D_p^*(k, q)}{m + \sum_{1-1}^{N} D_i(k, q) \cdot U_i^*(k, q)}\right\} \tag{20}$$

The coefficients $D_i$(k,q) in Eq.(20) are calculated from an estimate of the inverse noise spatial correlation matrix in the previous frame (q−1) and are given by equation 21 below:

$$D_i(k, q) = \sum_{p=1}^{N} \hat{K}_{ip}^{-1}(k, q-1) \cdot U_p(k, q). \tag{21}$$

For the case of N microphones, the Array Processing Output in Frequency Domain (Equation 12) is modified in a straightforward way, by indexing the summation over all microphones. Thus, Eq. (12) is modified to obtain equation (22) below:

$$X_q(k) = \frac{\sum_{i=1}^{N} U_i(k, q) H_i^*(k, q)}{\sum_{i=1}^{N} \hat{G}_i(k, q) H_i^*(k, q)}, \tag{22}$$

The antenna array processing algorithm can be described by the following equation in a frequency domain:

$$U_{OUT} = \sum_{i=1}^{N} U(\omega, r_i)[H^*]H^*(\omega, r_i), \tag{23}$$

where Uout (ω) and U (ω, ri) are respectively the Fourier transform of the [an] antenna processor output and the field u(t, ri) observed at the output of the i-th antenna element with the spatial coordinates ri, H (ω; ri) is the frequency response of the filter at the i-th antenna element.

We assume that the field u (t, $r_i$) is a superposition of the signals from M sound sources and background noise. When a mixture of the signals and background noise are incident on the received antenna array, the Fourier transform U (ω, $r_i$) of the field u(t, $r_i$) received by the i-th array element has the form:

$$U(\omega, r_1) = \sum_{m=1}^{M} S_m(\omega)\cdot G(\omega, r_i, R_m) + N(\omega, r_i), \tag{24}$$

where Sm (ω) is the spectrum of the signal from the m-th sound source, G(ω, ri, Rm) is the Green function which describes propagation channel from the m-th sound source with the spatial coordinates Rm to the i-th antenna element, and N (ω, ri) is the Fourier transform of the noise field.

Based on this model, the problem is to synthesize a noise reduction space-time processing algorithm, the output of which gives the optimal estimates of the signals from the desired users.

We consider this optimization problem as one of minimizing the output noise spectral density subject to an equality constrain $$S_{out}(\omega) = \sum_{m=1}^{M} B_m(\omega)\cdot S_m(\omega) \tag{25}$$

where [Sout (ω)] $S_{out}(\omega)$ is the spectrum of the signal after array processing, and

[B1 (ω)] $B_1(\omega)$, . . . , [BM (ω)] $B_M(\omega)$ are some arbitrary functions. The choice of these functions depends on our goal. For example, if we want to keep clear speech from all M users the functions [B1 (ω)] $B_1(\omega)$, . . . , [BM (ω)] $B_M(\omega)$ are chosen as $$[Bi(\omega)]B_i(\omega)\equiv 1, i\in[1,M]. \tag{26}$$

If the signal from some k-th sound source is unwanted and we would like to suppress its signal the functions [B1 (ω)] $B_1(\omega)$, . . . , [BM (ω)] $B_M(\omega)$ are chosen as $$B_i(\omega) = \begin{cases} 1, \text{ if } [i = k]\ i \neq k,\ i \in [1, M] \\ 0, \text{ if } i = k. \end{cases} \tag{27}$$

It is clear, that the constraint ([26] *25*) represents the degree of degradation of the desired signals and permits the combination of various frequency bins at the space-time processing output with a priori desired amplitude and phase distortion.

According to our approach the optimal weighting functions H (ω, $r_i$) are obtained as a solution of the variation problem $$H(\omega, r_i) = \arg\{\min g_{out}^{N}(\omega)\} \tag{28}$$

subject to the constraint ([26] *25*), where $$g_{out}^{N} f(\omega) = \sum_{i=1}^{N}\sum_{k=1}^{N} [gN]g^{N}(\omega, r_i, r_k)[H^*]H^*(\omega, r_i)[H^*(\omega, r_i)]H^*(\omega, r_k) \tag{29}$$

is the noise spectral density after array processing (23), and gN (ω; [ri, rk] $r_i$, $r_k$) is the spatial correlation function of the noise field N (ω; [ri] $r_i$).

It follows from Eq.(23) and Eq.(25) that the spectrum of the output signal has the form $$S_{out}(\omega) = \sum_{m=1}^{M} S_m(\omega)\sum_{i=1}^{N} G(\omega, r_i, R_m)[H^*]H^*(\omega, r_i) \tag{30}$$

Thus the constraint ([26] *25*) must be equivalent to the M linear constraints:

$$\sum_{i=1}^{N} G(\omega, r_i, R_m)[H^*]H^*(\omega; r_i) = B_m(\omega),\ m = [1, M]. \tag{31}$$

Therefore, the optimal weighting functions H(ω, [ri] $r_i$) in the algorithm (23) are obtained as a solution of the variation problem $$H(\omega, r_i) = \arg\left\{\sum_{i=1}^{N}\sum_{k=1}^{N} \min_{N}(\omega; r_i, r_k)[H^*]H^*(\omega, r_i)H^*_{-}(\omega, r_k)\right\} \tag{32}$$

subject to the M constraints (31).

The optimization problem (31)-(32) may be solved by using M Lagrange coefficients Wm (ω) to adjoin the constraints (31) to a new goal functional $$J(H) \equiv \sum_{i=1}^{N}\sum_{k=1}^{N} g_N(\omega; r_i, r_k)[H^*]H^*(\omega, r_i)H^*(\omega, r_k) - \sum_{m=1}^{M}[Wm]W_m(\omega)\left[\sum_{j=1}^{N} G(\omega, r_i, R_m)[H^*]H^*(\omega; r_i) - B_m(\omega)\right] \tag{33}$$

Minimization of this functional gives the following equations for the H(ω, [ri] $r_i$):

$$H(\omega, r_i) = \sum_{k=1}^{N}[gN]g_N(\omega; r_i, r_k)H(\omega, r_k)\sum_{m=1}^{M} W_m(\omega)G(\omega; r_i, R_m) \tag{34}$$

The solution of this system of equations can thus be presented in the form $$H(\omega, r_i) = \sum_{k=1}^{M} W_m(\omega) H(\omega; r_i, R_m), \tag{35}$$

where the functions H(ω; ri, Rm) satisfy the following system of equations $$\sum_{i=1}^{N} g_N(\omega; r_i, r_k) H(\omega; r_k, R_m) = G(\omega, r_i, R_m) \tag{36}$$

To obtain the unknown Lagrange coefficients [Wm] $W_m$ (ω) in Eq.(35) we substitute Eq.(35) into Eq.(31). As a result, we get $$\sum_{k=1}^{M} W_k(\omega) \sum_{i=1}^{N} G(\omega; r_i, R_m) H^*(\omega, r_i, R_k) = B_m(\omega) \tag{37}$$

from which it can be seen that the Lagrange coefficients Wm (ω) satisfy the following system of equations:

$$\sum_{k=1}^{M} \Psi_{mk}(\omega) W_k(\omega) = B_m(\omega) \tag{38}$$

where $$\Psi_{mk}(\omega) = \sum_{i=1}^{N} G(\omega, r_i, R_m) H^*(\omega, r_i, R_k). \tag{39}$$

If there is just one user in the system then M=1 and from Eq.(38) we get:

$$W(\omega) = B_1(\omega)[+]/\sum_{i=1}^{N} G(\omega; r_i, R_1) H^*(\omega, r_i, R_1) \tag{40}$$

Substitution of this equation into Eq. (35) gives the optimal functions:

$$H(\omega, r_i) = /B_1(\omega)[\times] \cdot H(\omega; r_i, R_1)//\sum_{i=1}^{N} G(\omega, r_i, R_1)[\times] \cdot H^*(\omega; r_i, R_1) \tag{41}$$

which was already obtained and thus disclosed in the above-mentioned '481 patent to present inventor Krasny et al, and which is now hereby incorporated by reference herein.

Substituting Eq.(35) into Eq.(23) we get the optimal space-time noise reduction algorithm as $$U_{out}(\omega) = \sum_{m=1}^{M} W_m(\omega) \cdot U_m(\omega) \tag{42}$$

-continued where $$U_m(\omega) = \sum_{i=1}^{N} U(\omega; r_i) H^*(\omega, r_i, R_m) \tag{43}$$

The algorithm (42) describes the multichannel system which consists of M spatial channels $\{U_1(\omega), \ldots, U_M(\omega)\}$. The frequency responses $H(\omega; r_i, R_m)$ of the filters at the each of these channels are matched with the spatial structure of the signal from the m-th user and the background noise and satisfy the system of equations (37). One can see that the array processing in the m-th spatial channel is optimized to detect signal from the m-th user against the background noise. The output voltages of the M spatial channels are accumulated with the weighting functions $\{W_1(\omega), \ldots, W_M(\omega)\}$, which satisfy the system of equations (38).

An interesting interpretation of the optimal algorithm is to present the solution of the system (39) in the form $$W_m(\omega) = \sum_{k=1}^{M} \Psi_{mk}^{-1}(\omega) \cdot B_k(\omega), \tag{44}$$

where $\Psi^{-1}{}_{mk}(\omega)$ denotes the elements of the matrix $\Psi^{-1}$ (ω), which is an inverse of the matrix Ψ(ω) with elements $\Psi_{mk}$ (ω). Substituting Eq.(44) into Eq.(42) we get $$U_{out}(\omega) = \sum_{k=1}^{M} B_k(\omega) \left\{ \sum_{m=1}^{M} \Psi_{mk}(\omega) \sum_{i=1}^{N} U(\omega, r_i) H^*(\omega, r_i, R_m) \right\}. \tag{45}$$

One can see that $$S_k(\omega) = \sum_{m=1}^{M} \Psi_{mk}^{-1}(\omega) \sum_{i=1}^{N} U(\omega, r_i) H^*(\omega, r_i, R_m) \tag{46}$$

is the ML estimate of the signal spectrum Sk (ω) from the k-th user.

Therefore, the optimal algorithm estimates the signal spectrums from all users and accumulates these estimates with constraint functions Bk (ω), i.e.

$$U_{out}(\omega) = \sum_{k=1}^{M} B_k(w) \cdot S_k(w). \tag{47}$$

As an example, [Let] *Let* us assume that there are two sound sources and we would like to keep the signal from the desired sound source and suppress the signal from the second source. In this case we choose M=2. Therefore, the system consists of two spatial channels $$U_1(\omega) = \sum_{i=1}^{N} U(\omega, r_i)[H^*] H^*(w; r_i, R_1) \text{ and}$$

$$U_2(\omega) = \sum_{i=1}^{N} U(\omega, r_i)[H^*] H^*(w; r_i, R_2)$$

The frequency responses of the filters H (ω; ri, [R1] $R_1$) at the first channel are matched with the spatial coordinates [R1] $R_1$ of the desired signal source and the frequency responses of the filters H (ω; ri, [R2] $R_2$) at the second channel are matched with the spatial coordinates [R2] $R_2$ of the second signal source.

The functions [B1(ω)] $B_1(\omega)$ and [B2(ω)] $B_2(\omega)$ are chosen according to equations $$B_1(\omega)=1, B_2(\omega)=0. \tag{48}$$

In this case the weighting functions $W_1(\omega)$ and $W_2(\omega)$ are described by the equations $$W_1(\omega) = B_1(\omega)^* \Psi_{22}(\omega)/D(\omega)$$

$$[W2]\ W_2(\omega) = B_1(\omega)^* \Psi_{12}(\omega)/D(\omega)$$

where $$D(\omega) = \Psi_{11}(\omega)\cdot\Psi_{22}(\omega) - |\Psi_{12}(\omega)|^2$$

Therefore, the optimal algorithm has the form $$[U_{out}^{(\omega)}]U_{out}(\omega) = \tag{49}$$

$$B_1(\omega)\cdot\Psi_{22}(w)/D(\omega)^*\{[U1]U_1(\omega) - [U2]U_2(\omega)\Psi_{12}(w)/\Psi_{22}(w)\}$$

According to Eq.(49) the optimal array processing uses two spatial channels: a signal channel [U1(ω)] $U_1(\omega)$ representing the received speech signal from the desired [715] signal source and the compensation channel [U2(ω)] $U_2(\omega)$ representing the signal [U2(ω)] $U_2(\omega)$ from the second source.

The signal $U_2(\omega)$ is weighted by a function [Ψ12(ω)/Ψ22(ω)] $\Psi_{12}(\omega)/\Psi_{22}(\omega)$ and subtracted from the signal [U1(ω)] $U_1(\omega)$. This algorithm separates signals from two sources and produces the output signal $U_{out}$ (ω) where the signal from the second source is completely suppressed.

Thus it has been described above how many situations in which multiple microphones exist are not, in the prior art, benefiting from the potential of multiple microphone array processing, and thus may be improved by using the invention with the above-described adaptive signal processing.

A person of ordinary skill in the art based on the above teachings, may recognize additional scenarios in which acoustic transducers exist that are not today being employed for joint processing, and using the teachings herein can improve the performance in those scenarios by connecting the transducers in such a way that the [just described] *above-described* noise enhancement algorithms can be employed to advantage.

We claim:

1. A system [and apparatus] for dynamically improving [the] ratio of a wanted speech signal from a principal speaker to random background noise that is not known or characterized a priori, comprising:

a principal microphone configured to be worn by said principal speaker and configured to produce a [first] *principal* audio signal containing a [first] sampling of [the] wanted speech plus unwanted background noise that has not previously been measured or characterized;

at least one incidental microphone located remotely from said principal microphone by several acoustic wavelengths at a mid-band audio frequency, [and] *each said at least one incidental microphone* configured to produce a [second] *respective incidental* audio signal containing a [second] sampling of at least said unwanted background noise that has not previously been measured or characterized; and a signal processor configured to dynamically jointly process said [first] *principal audio* and [second] *at least one said incidental* audio [signals]*signal*, without reference to noise profiles or filters constructed in advance, by receiving and processing said [first] *principal* audio signal to determine a first set of individual spectral components at a set of predetermined frequencies;

receiving and processing *the* at least *one* said [second] *incidental* audio signal to determine *at least* one [or more] additional [sets] *set* of individual spectral components at said set of predetermined frequencies; [and]

dynamically combining corresponding spectral components from said first set and *the at least* one [or more of said] additional [sets] *set* to obtain a combined set of spectral components in which unwanted background noise components are reduced compared to wanted speech components; and generating an output audio waveform solely from the combined set of spectral components, without filtering or suppressing noise by reference to a predetermined noise profile, in which [the] ratio of the wanted speech to unwanted noise is greater than [the] corresponding ratio for either the [first] *principal* or [the second] *any of the at least one said incidental* audio signal*s* alone.

2. The system [and apparatus] of claim 1 in which said principal microphone is part of a Bluetooth wireless headset and said *at least one* incidental microphone is part of a Bluetooth-equipped communication device in wireless communication with said Bluetooth headset.

3. The system [and apparatus] of claim 1, further comprising additional microphones producing additional audio signals containing different samplings of said wanted speech signal and unwanted background noise, and wherein the signal processor is configured to receive all of the [first] *principal*, [second] *at least one said incidental*, and *said* additional audio signals, and [to derive therefrom a derived output signal] *to dynamically jointly process also said additional audio signals*, wherein, *in the output audio waveform generated*, the ratio of said wanted [signal] *speech* to unwanted background noise is greater than the corresponding ratio for any of the audio signals alone.

4. The system [and apparatus] of claim 1, further comprising additional microphones producing additional audio signals containing different samplings of said wanted speech signal and unwanted background noise, and wherein the signal processor is configured to receive all of the [first] *principal*, [second] *at least one said incidental*, and *said* additional audio signals and [to derive a derived output signal by processing] *to dynamically jointly process* the [first] *principal and at least one incidental* audio signal*s* jointly with a selected one of the [second and] *said* additional audio [signal] *signals*, wherein the ratio of said wanted [signal] *speech* to unwanted background noise in the [derived signal] *output audio waveform generated* is greater than the corresponding ratio for any of the audio signals alone.

5. The system [and apparatus] of claim 1 in which said joint processing comprises time-domain to spectral domain [converters] *conversion* for separating said [first] *principal* and [second] *at least one said incidental* audio signals into *said* spectral components, [a] spectral [combiner] *combining* for performing weighted combining of corresponding *said* spectral components to produce [a] *said* combined *set of* spectral [domain signal] *components*, and [a] spectral domain to time domain [converter] *conversion* to convert said combined *set of* spectral [domain signal] *components* to *generate* said [derived] output [signal] *audio waveform*.

6. A system [and apparatus] for dynamically enhancing speech communications between [a first multiplicity of speakers] *three or more persons* in the presence of random acoustic background noise that is not known or characterized a priori, comprising:

[a second multiplicity of microphones arranged such that for each of said first multiplicity of speakers, at least one of the second multiplicity of microphones is a principal microphone associated with that speaker, the second multiplicity of microphones producing a corresponding number of audio output signals containing different combinations of wanted speech and] *a plurality of at least three microphones arranged such that at least one microphone is associated with each said person, wherein each microphone outputs an audio signal containing speech if the associated person is speaking, or* acoustic background noise *alone* that has not previously been measured or characterized; and a signal processor configured to dynamically process jointly an audio [output] signal [from a principle microphone] *containing speech* along with [one] *two* or more [other] said audio [ output] signals *containing acoustic background noise* in order to derive a derived output signal [solely from the audio signals and] without reference to noise profiles or filters constructed in advance, in which [the] *a* ratio of [the] speech [signal from the principle microphone] to [unwanted] *acoustic* background noise is greater than [the] *a* corresponding ratio for [any one of said] *the* audio [output signals] *signal containing speech or the two or more said audio signals containing acoustic background noise* alone;

wherein the joint processing of the audio output signal [from the principle microphone] *containing speech* and [one] *the two* or more [other] said audio [output] signals *containing acoustic background noise* includes, *on a frame-block basis:* estimating [a signal] *an inverse noise* correlation matrix without reliance on stored statistics;

for each audio signal, distinguishing [between noise with] *whether* speech present [ and noise without speech present], updating the [signal] *inverse noise spatial* correlation matrix only if speech is present, and calculating a frequency response from the updated [signal] *inverse noise spatial* correlation matrix *if speech is* present, or from a non-updated inverse noise spatial correlation matrix if speech is not present;

dynamically jointly processing the frequency [responses] *response* for [each] *the audio signal containing speech and two or more* audio signals *containing acoustic background noise* to derive an output signal in [the] frequency domain [solely from the audio output signals and] without reference to noise profiles or filters constructed in advance; and converting the derived output signal to [the] *a* time domain.

7. The system [and apparatus] of claim 6 in which [the] *an* audio output *signal* of at least one of said [multiplicity of] *plurality of at least three* microphones is conveyed to said signal processor by a wireless link using any of a Bluetooth radio frequency link; a WiFi radio frequency link; a modulated [Infra Red] *infrared* link; an analog frequency-modulated link; a digital wireless link; a modulated visible light link; an inductively-coupled link and an electrostatically-coupled link.

8. The system [and apparatus] of claim 6 configured for a lecture hall environment in which said [first multiplicity of speakers may] *three or more persons* comprises a first group of speakers on stage and a second group speakers in [the] *an* audience, and said [second multiplicity of] *plurality of at least three* microphones comprises any combination of wireless microphones, lapel microphones, wireless headsets, fixed microphones, and roaming microphones.

9. The system and [apparatus] of claim 6 configured for use on [the] *a* flight deck of an aircraft, in which said [second multiplicity of] *plurality of at least three* microphones comprises [the] headsets provided for at least two crew members.

10. A system [and apparatus] for improving [the] *a* speech quality of conference calls using a telephone network, comprising:

a first conference phone installed at a first location and configured to serve a first group containing at least one intermittent speaker;

at least one second conference phone installed at a second location and configured to serve a second group containing at least one second intermittent speaker, the first *phone* and at least one second conference [phones] *phone* being in mutual communication via a telephone network;

at least [two] *three* microphones *at* at least one of said first [or at least one] second location configured to produce corresponding audio output signals containing respective samplings of a wanted speech signal and *unwanted* background noise;

a signal processor configured to receive said audio output signals from said at least [ two] *three* microphones and to dynamically jointly process [the at least two] audio *output* signals to derive therefrom, solely from the audio *output* signals and without reference to noise profiles or filters constructed in advance, a derived output signal in which [the] *a* ratio of the wanted speech signal to unwanted background noise is greater than [the] *a* corresponding ratio for the audio *output* signal from any one alone of said at least [two] *three* microphones, said derived [audio] output signal from the signal processor being transmitted via said telephone network from [the] *a* location of the at least [two] *three* microphone*s* to all other locations *participating* in the [conference] *mutual communication via the telephone network*;

wherein the joint processing of the audio output [signal from the principle microphone and one or more other said audio output] signals *containing respective samplings of a wanted speech signal and unwanted background noise* includes, *on a frame-block basis:* estimating a signal correlation matrix without reliance on stored statistics;

*estimating an inverse noise spatial correlation matrix;* for each audio signal, distinguishing between noise with speech present and noise without speech present, updating the signal correlation matrix only if speech is present, and calculating a frequency response from the updated signal correlation matrix *and the inverse noise spatial correlation matrix if speech is present, or*

*from a non-updated signal correlation matrix and the inverse noise spatial correlation matrix if speech is not present*;

dynamically jointly processing the frequency responses for each audio signal to derive an output signal in [the] *a* frequency domain solely from the audio signals and without reference to noise profiles or filters constructed in advance; and converting the derived output signal to [the] *a* time domain.

11. The system [and apparatus] of claim 10 in which said at least [ two] *three* microphones comprises any of one or more microphones associated with said *first conference phone or said at least one second* conference phone and connected thereto; any headset or lapel microphones worn by any person; any microphone contained by or connected to a laptop computer by wire or wireless means and any other fixed or hand-held microphones.

12. The system [and apparatus] of claim 10 in which said signal processor is located within said *first conference phone or said at least one second* conference phone, and the *first conference phone or said at least one second* conference phone is configured to receive the audio signals from said at least [two] *three* microphones using any of a wired connection; a wireless connection, or a connection to a server that forwards audio signals received at the server from any microphone.

13. The system [and apparatus] of claim 10 in which said signal processor is implemented in software on a server, the server being configured to receive audio signals from said at least [two] *three* microphones and to derive said derived output signal.

14. A method for improving [the] *a* signal to noise ratio of an audio signal received from a microphone associated with a principal active speaker, comprising the steps of:

*providing a plurality of microphones;* associating at least one microphone *of the plurality of microphones* with each of a number of potential speakers;

determining [the] microphone *of the plurality of microphones* that is *normally* associated with the principal active speaker *from among the number of potential speakers*;

activating or maintaining in an active state at least one other microphone *of the plurality of microphones* that is *normally* associated with a speaker *from among the number of potential speakers* other than the principal active speaker; and jointly processing*, in a frequency domain and without performing beamforming,* in a *digital* signal processor*,* [the] audio signals received from the microphone *of the plurality of microphones that is normally* associated with the principal active speaker [and] *together with audio signals received from* said at least one other microphone *of the plurality of microphones* in order to derive a processed signal in which [the] *a* ratio of [the] *a* wanted speech signal from the principal active speaker to background noise is greater than from any one microphone *of the plurality of microphones* alone.

15. The method of claim 14 in which the step of determining the microphone *of the plurality of microphones that is* associated with the principal active speaker is based on [the] *a* state of a press-to-talk switch associated with the microphone.

16. The method of claim 14 in which the step of determining the microphone *of the plurality of microphones that is* associated with the principal active speaker is based on an indication from a Voice Activity Detector associated with the microphone.

17. The method of claim 14 wherein jointly processing the audio signals received from the microphone *of the plurality of microphones that is* associated with the principal active speaker and said at least one other microphone *of the plurality of microphones* comprises:

decomposing all [the] *such* audio signals into a set of narrowband constituent components using a windowed Fast Fourier Transform;

processing overlapping blocks of signals, wherein [the] *an* overlap of a windowing function adds to unity, and applying frequency domain filtering on a frame-block basis;

estimating a signal correlation matrix and [a] *an inverse* noise spatial correlation matrix*, based on a recursive linear squares algorithm modified for processing in a frequency domain,* for each frame;

using voice activity detection on each audio signal to distinguish between noise with speech present and noise without speech present;

for each audio signal in each frame, updating the signal correlation matrix only if speech is present, and updating the *inverse* noise spatial correlation matrix only if speech is not [detected] *present*;

calculating Green's function [for each frame] from the updated signal correlation matrix *if speech is present, or from a non-updated signal correlation matrix if speech is not present*;

calculating a frequency response for each audio signal from the *calculated Green's function and the* updated [signal] *inverse noise* correlation matrix *if speech is not present, or from a non-updated inverse noise correlation matrix if speech is present*;

calculating an output signal in the frequency domain from the [Green's function and] frequency responses; and converting the output signal to [the] *a* time domain using inverse Fast Fourier Transform.

[18. The method of claim 17, wherein the noise spatial correlation matrix is calculated using a recursive linear squares algorithm modified for processing in the frequency domain.]

19. The method of claim 17, further comprising calculating *a* power spectral density of the output signal if speech is detected, prior to *the converting using* the inverse Fast Fourier Transform.

[20. A Press-To-Talk (PTT) communication system comprising:

at least two communication terminals, each terminal including a pressel switch used by an operator of the terminal to indicate active speech; and a signal processor operative to continuously receive the state of the pressel switch from each terminal;

continuously receive an audio signal from each terminal, regardless of the state of the pressel switch;

determine, from the states of all pressel switches, a currently active speaker;

jointly process audio signals from the currently active speaker's terminal and at least one other terminal to derive an output audio signal in which the ratio of speech by the currently active speaker to background noise is greater than such ratio derived from any one terminal alone; and output the derived output audio signal to at least one terminal.]

21. The system [and apparatus] of claim 1 wherein dynamically jointly [process] *processing* said [first] principal *audio signal* and [second] *the at least one said incidental* audio [ signals]*signal*, without reference to noise profiles or filters constructed in advance, further comprises processing the audio signals under [the] *a* constraint that [the] *a* spectrum of the wanted speech is substantially unchanged.

22. The system [and apparatus] of claim 10 wherein the joint processing of the audio output [signal from the principle microphone and one or more other said audio output] signals *containing respective samplings of a wanted speech signal and unwanted background noise* comprises joint processing under [the] *a* constraint that [the] *a* spectrum of the wanted speech signal is substantially unchanged.

23. The method of claim 14 wherein jointly processing the audio signals received from the microphone associated with the principal active speaker and said at least one other microphone comprises jointly processing the audio signals under [the] *a* constraint that [the] *a* spectrum of the wanted speech signal from the principal active speaker is substantially unchanged.

*24. The system of claim 1 in which said principal microphone is part of a Bluetooth wireless device and said at least one incidental microphone is part of a Bluetooth-equipped communication device in which wireless communication with said Bluetooth device.*

*25. A system for dynamically improving a ratio of a wanted audio signal to unwanted noise that is not known or characterized a priori, comprising:*

*a principal microphone configured to produce a principal audio signal containing a sampling of the wanted audio signal and unwanted noise that has not previously been measured or characterized;*

*at least one incidental microphone located remotely from said principal microphone by several audio wavelengths at a mid-band audio frequency and configured to produce at least one corresponding incidental audio signal containing a sampling of said unwanted noise that has not previously been measured or characterized; and*

*a signal processor configured to dynamically jointly process said principal audio signal and said at least one incidental audio signal, without reference to profiles or filters constructed in advance with respect to said unwanted noise,*

*by receiving and processing said principal audio signal to determine a first set of individual spectral components at a set of predetermined frequencies;*

*receiving and processing said at least one incidental audio signal to determine one or more additional sets of individual spectral components at said set or predetermined frequencies; and*

*dynamically combining corresponding spectral components from said first set and one or more of said additional sets to obtain a combined set of spectral components in which unwanted noise components are reduced compared to wanted audio signal components; and*

*generating an output audio waveform solely from the combined set of spectral components, without filtering or suppressing unwanted noise by reference to a predetermined noise profile, in which the ratio of the wanted audio signal to the unwanted noise is greater than a corresponding ratio for either said principal microphone or any of said at least one incidental microphone alone.*

*26. The system of claim 1 in which said principal microphone is part of a first wireless communications device and said at least one incidental microphone is a part of a second wireless communications device in wireless communication with said first wireless communications device.*

*27. The system of claim 1 wherein dynamically combining corresponding spectral components from said first set and the at least one said additional set comprises combining the corresponding spectral components by minimizing said background noise components under a nonlinear equality constraint leaving characteristics of the wanted speech components nominally undisturbed or having an a priori desired amplitude and phase distortion.*

*28. The system of claim 1 wherein positions of said principal microphone and said at least one incidental microphone are arbitrary relative to each other, other than said at least one incidental microphone being located remotely from said principal microphone by several acoustic wavelengths at a mid-band audio frequency.*

*29. The system of claim 1 wherein a position of at least one of said at least one incidental microphones is changing relative to said principal microphone.*

*30. The system of claim 6 wherein positions of the plurality of at least three microphones are arbitrary relative to each other.*

*31. The system of claim 6 wherein a position of at least one of the plurality of at least three microphones is changing relative to another of the plurality of at least three microphones.*

*32. The method of claim 14 wherein jointly processing audio signals received from the microphone of the plurality of microphones that is normally associated with the principal active speaker together with audio signals received from said at least one other microphone of the plurality of microphones comprises jointly processing the audio signals subject to a nonlinear equality constraint that represents a predetermined degree of degradation of the speech.*

*33. The method of claim 14 wherein jointly processing audio signals received from the microphone associated with the principal active speaker and said at least one other microphone comprises jointly processing the audio signals to minimize the background noise under a nonlinear equality constraint leaving the characteristics of the wanted speech signal nominally undisturbed or having a predetermined amplitude and phase distortion representing a degree of degradation of the wanted speech signal.*

*34. The system of claim 25 in which said principal microphone is part of a first wireless communications device and said at least one incidental microphone is a part of a second wireless communications device in wireless communication with said first wireless communications device.*

*35. The system of claim 25, further comprising additional microphones producing additional audio signals containing different samplings of said wanted audio signal and unwanted background noise, and wherein the signal processor is configured to receive all of the principal, at least one incidental, and said additional audio signals, and to dynamically jointly process also said additional audio signals, wherein, in the output audio waveform generated, the ratio of said wanted audio signal to unwanted background noise is greater than the corresponding ratio for any of the audio signals alone.*

*36. The system of claim 25, further comprising additional microphones producing additional audio signals containing different samplings of said wanted speech signal and unwanted background noise, and wherein the signal processor is configured to receive all of the principal, at least one*

*incidental, and additional audio signals and to dynamically jointly process the principal and at least one incidental audio signals jointly with a selected one of the additional audio signals, wherein the ratio of said wanted audio signal to unwanted background noise in the output audio waveform generated is greater than the corresponding ratio for any of the audio signals alone.*

*37. The system of claim 25 in which said joint processing comprises time-domain to spectral domain conversion for separating said principal and at least one said incidental audio signal into said spectral components, spectral combining for performing weighted combining of corresponding said spectral components to produce said combined set of spectral components, and spectral domain to time domain conversion to convert said combined set of spectral components to generate said output audio waveform.*

*38. The system of claim 25 wherein dynamically combining corresponding spectral components from said first set and one or more of said additional sets comprises combining the corresponding spectral components by minimizing said background noise under a nonlinear equality constraint leaving characteristics of the wanted audio signal nominally undisturbed or having a predetermined amplitude and phase distortion representing a degree of degradation of the wanted audio signal.*

*39. The system of claim 25 wherein positions of said principal microphone and said at least one incidental microphone are arbitrary relative to each other, other than said at least one incidental microphone being located remotely from said principal microphone by several acoustic wavelengths at a mid-band audio frequency.*

*40. The system of claim 25 wherein a position of at least one of said at least one incidental microphones is changing relative to said principal microphone.*

*41. A system for dynamically enhancing speech communications between two people in the presence of random acoustic background noise that is not known or characterized a priori, comprising:*

*two microphones arranged such that one microphone is associated with each said person, wherein each microphone ouptuts an audio signal containing speech if the associated person is speaking, or an audio signal containing acoustic background noise alone that has not previously been measured or characterized; and*

*a signal processor configured to dynamically process jointly an audio signal containing speech along with one audio signal containing acoustic background noise in order to derive a derived an output signal, without reference to noise profiles or filters constructed in advance, in which a ratio of speech to acoustic background noise is greater than a corresponding ratio for the audio signal containing speech alone, or for the one audio signal containing acoustic background noise alone;*

*wherein the joint processing of the audio output signal containing speech and the one audio signal containing acoustic background noise includes, on a frame-block basis:*

*estimating a noise correlation matrix without reliance on stored statistics;*

*for each audio signal,*

*distinguishing whether speech is present,*

*updating the noise spatial correlation matrix only if speech is present, and*

*calculating a frequency response from the updated noise spatial correlation matrix if speech is present, or from a non-updated spatial correlation matrix if speech is not present;*

*dynamically jointly processing the frequency responses for the audio signal containing speech and the one audio signal containing acoustic background noise to derive an output signal in a frequency domain without reference to noise profiles or filters constructed in advance; and*

*converting the derived output signal to a time domain.*

* * * * *